(12) United States Patent
Zhang et al.

(10) Patent No.: US 10,860,226 B2
(45) Date of Patent: Dec. 8, 2020

(54) SYSTEMS AND METHODS OF SYNCHRONIZING CONFIGURATION INFORMATION IN A CLUSTERED STORAGE ENVIRONMENT

(71) Applicant: EMC IP Holding Company LLC, Hopkinton, MA (US)

(72) Inventors: Ping Zhang, Shrewsbury, MA (US); Charles W. Kaufman, Redmond, WA (US); Gregory W. Lazar, Upton, MA (US); Xuan Tang, Hopkinton, MA (US); Yi Fang, Sharon, MA (US); Xiongfei Chen, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 330 days.

(21) Appl. No.: 15/965,156

(22) Filed: Apr. 27, 2018

(65) Prior Publication Data

US 2019/0332297 A1 Oct. 31, 2019

(51) Int. Cl.
*G06F 3/06* (2006.01)
*G06F 21/60* (2013.01)
*H04L 29/06* (2006.01)
*G06F 21/62* (2013.01)

(52) U.S. Cl.
CPC .......... *G06F 3/0632* (2013.01); *G06F 3/0604* (2013.01); *G06F 3/067* (2013.01); *G06F 21/602* (2013.01); *H04L 63/029* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 6,823,349 B1 * | 11/2004 | Taylor | G06F 11/2082 |
| 7,080,221 B1 | 7/2006 | Todd et al. | |
| 7,805,583 B1 | 9/2010 | Todd et al. | |
| 8,775,861 B1 | 7/2014 | Raizen et al. | |
| 9,400,611 B1 | 7/2016 | Raizen | |
| 9,594,822 B1 | 3/2017 | Natanzon et al. | |
| 9,910,791 B1 | 3/2018 | Dibb et al. | |
| 2005/0114488 A1 * | 5/2005 | Klein | H04L 69/329 709/223 |

(Continued)

*Primary Examiner* — Joseph P Hirl
*Assistant Examiner* — Hassan Saadoun
(74) *Attorney, Agent, or Firm* — BainwoodHuang

(57) ABSTRACT

Techniques for synchronizing configuration information in a clustered storage environment. The techniques allow a system administrator or other user to make additions and/or updates to configuration information in one or more configuration files, which are automatically propagated for storage in multiple data storage appliances within a storage domain. By allowing a user to make changes to configuration files associated with a primary appliance within the storage domain, and automatically propagating the configuration files in a background process from the primary appliance to multiple secondary appliances within the storage domain, the user can more readily assure consistency of the configuration information, not only among the primary and secondary appliances within the storage domain, but also among previously unavailable or unreachable data storage appliance(s) that may be recovered and brought back on line within the storage domain.

16 Claims, 3 Drawing Sheets

(56) References Cited

U.S. PATENT DOCUMENTS

| | | | |
|---|---|---|---|
| 2007/0226777 A1* | 9/2007 | Burton | H04L 63/08 726/2 |
| 2008/0229039 A1* | 9/2008 | Maki | G06F 11/006 711/162 |

* cited by examiner

SYSTEMS AND METHODS OF SYNCHRONIZING CONFIGURATION INFORMATION IN A CLUSTERED STORAGE ENVIRONMENT

BACKGROUND

Conventional data storage systems typically store configuration information that describes the physical and/or logical configurations of the data storage systems. Such configuration information may include information pertaining to groupings of redundant arrays of inexpensive disks (RAID), logically defined storage devices, security information pertaining to user accounts and/or domain credentials, etc. In a clustered storage environment, such configuration information is typically managed and synchronized across multiple data storage appliances within a storage domain. For example, the configuration information may be separately managed on each data storage appliance and manually synchronized across the respective storage appliances within the storage domain. Further, the configuration information may be managed on one data storage appliance designated as a "primary appliance" within the storage domain, and other data storage appliances designated as "secondary appliances" within the storage domain may be directed to access the configuration information from the primary appliance. The configuration information may also be maintained in a distributed database that is accessible to all of the data storage appliances within the storage domain.

SUMMARY

In a clustered storage environment, data storage appliances within a storage domain may at times be subjected to node failures and/or network partitions that cause one or more of the data storage appliances to become unavailable or unreachable, not only possibly preventing configuration information stored on the respective storage appliances from being separately managed or managed in a primary-secondary arrangement of the data storage appliances, but also possibly preventing the data storage appliances from accessing the configuration information from a distributed database. Moreover, once the unavailable or unreachable data storage appliance(s) are recovered and brought back on line, a system administrator may be unable to assure that all of the data storage appliances within the storage domain have a most recent version of the configuration information, without performing the tedious task of manually synchronizing the most recent version of the configuration information across the respective storage appliances within the storage domain.

Techniques are disclosed herein for synchronizing configuration information in a clustered storage environment. The disclosed techniques allow a system administrator or other user to make additions and/or updates to configuration information in one or more configuration files, which are automatically propagated for storage in multiple data storage appliances within a storage domain. The disclosed techniques can perform such automatic propagation of configuration files within a storage domain by allowing the user to write or otherwise make changes to one or more configuration files, and, once the configuration files are determined to be stable, placing the configuration files in a staging directory of a primary appliance within the storage domain. Having placed the configuration files in the staging directory of the primary appliance, the disclosed techniques can initiate a first background process that copies the configuration files in the staging directory to an updates directory of the primary appliance, and automatically propagates the configuration files in the updates directory of the primary appliance to corresponding updates directories in multiple secondary appliances within the storage domain. Once the configuration files have been propagated to the secondary appliances within the storage domain, the disclosed techniques can initiate a second background process that copies the configuration files in the updates directory of each secondary appliance to a staging directory of the secondary appliance, and copies the configuration files in the staging directory of the secondary appliance for storage in a configuration storage area on the secondary appliance.

By allowing a user to make changes to configuration files associated with a primary appliance within a storage domain, and automatically propagating the configuration files in a background process from the primary appliance to multiple secondary appliances within the storage domain, the user can more readily assure consistency of the configuration information, not only among the primary and secondary appliances within the storage domain, but also among previously unavailable or unreachable data storage appliance(s) that may be recovered and brought back on line within the storage domain.

In certain embodiments, a method of synchronizing configuration information across a plurality of data storage appliances in a clustered storage environment includes implementing at least one configuration of the plurality of data storage appliances as at least one configuration file. The plurality of data storage appliances includes a primary storage appliance and one or more secondary storage appliances in the clustered storage environment. The method further includes (i) obtaining the configuration file by the primary storage appliance, (ii) having obtained the configuration file, initiating a background process to run on the primary storage appliance, and (iii) automatically propagating the configuration file, in the background process, from the primary storage appliance to the respective secondary appliances in the clustered storage environment.

In certain aspects, the primary storage appliance is a member of a storage domain, and the method includes determining whether a respective secondary appliance among the secondary storage appliances is a second member of the storage domain. The method further includes (i) having determined that the respective secondary appliance is the second member of the storage domain, obtaining domain credentials of the respective secondary appliance, (ii) authenticating the primary storage appliance to the respective secondary appliance using the domain credentials, and (iii) having authenticated the primary storage appliance to the respective secondary appliance, establishing a secure channel between the primary storage appliance and the respective secondary appliance. The method still further includes automatically propagating the configuration file, in the background process, to the respective secondary appliance over the secure channel within an Internet protocol (IP) security (IPsec) tunnel.

In certain further aspects, the primary storage appliance stores a secret key in association with a lockbox file, and the method includes sending, over the secure channel, a copy of the secret key from the primary storage appliance to the respective secondary appliance for storage in association with a second lockbox file on the respective secondary appliance. The method further includes encrypting the configuration file in the background process, and automatically propagating, over the secure channel, the encrypted configuration file, in the background process, to the respective secondary appliances in the clustered storage environment.

In certain other aspects, the method includes (i) implementing the updated configuration of the plurality of data storage appliances as at least one updated configuration file, (ii) placing the updated configuration file in a staging directory of the primary storage appliance, (iii) informing a daemon application of the primary storage appliance that the updated configuration file has been placed in the staging directory of the primary storage appliance, and (iv) having informed the daemon application, performing the background process by the daemon application of the primary storage appliance.

In certain additional aspects, the method includes copying, in the background process, the updated configuration file in the staging directory of the primary storage appliance to an updates directory of the primary storage appliance, and automatically propagating, in the background process, the updated configuration file in the updates directory of the primary storage appliance to corresponding updates directories in the respective secondary appliances in the clustered storage environment.

In certain further aspects, a respective secondary appliance among the secondary storage appliances has an updates directory, and the method includes (i) comparing a timestamp on the updated configuration file in the updates directory of the primary storage appliance with another timestamp on a corresponding configuration file in the updates directory of the respective secondary appliance to determine whether the updated configuration file is a new or newly updated configuration file, and (ii) having determined that the updated configuration file is the new or newly updated configuration file, automatically propagating, in the background process, the new or newly updated configuration file in the updates directory of the primary storage appliance to the updates directory of the respective secondary appliances.

In certain further embodiments, a system for synchronizing configuration information across a plurality of data storage appliances in a clustered storage environment includes a primary storage appliance and one or more secondary storage appliances. The primary storage appliance is configured (i) to obtain at least one configuration file that implements at least one configuration of the plurality of data storage appliances in the clustered storage environment, (ii) having obtained the configuration file, to initiate a background process to run on the primary storage appliance, and (iii) to automatically propagate the configuration file, in the background process, to the respective secondary appliances in the clustered storage environment.

In certain other embodiments, a computer program product has a non-transitory computer readable medium that stores a set of instructions to synchronize configuration information across a plurality of data storage appliances in a clustered storage environment, in which the set of instructions, when carried out by computerized circuitry, causes the computerized circuitry to perform a method of (i) implementing at least one configuration of the plurality of data storage appliances as at least one configuration file, the plurality of data storage appliances including a primary storage appliance and one or more secondary storage appliances in the clustered storage environment, (ii) obtaining the configuration file by the primary storage appliance, (iii) having obtained the configuration file, initiating a background process to run on the primary storage appliance, and (iv) automatically propagating the configuration file, in the background process, from the primary storage appliance to the respective secondary appliances in the clustered storage environment.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings, in which like reference characters refer to the same parts throughout the different views.

FIG. 1a is a block diagram of a clustered storage environment, in which exemplary techniques for synchronizing configuration information across multiple data storage appliances within a storage domain can be employed;

FIG. 1b is a block diagram of an exemplary data storage appliance included in the clustered storage environment of FIG. 1a;

FIG. 3 is a flow diagram of an exemplary method of synchronizing configuration information across multiple data storage appliances within the clustered storage environment of FIG. 1a.

DETAILED DESCRIPTION

Techniques are disclosed herein for synchronizing configuration information in a clustered storage environment. The disclosed techniques allow a system administrator or other user to make additions and/or updates to configuration information in one or more configuration files, which are automatically propagated for storage in multiple data storage appliances within a storage domain. By allowing the user to make changes to configuration files associated with a primary appliance within the storage domain, and automatically propagating the configuration files in a background process from the primary appliance to multiple secondary appliances within the storage domain, the user can more readily assure consistency of the configuration information, not only among the primary and secondary appliances within the storage domain, but also among previously unavailable or unreachable data storage appliance(s) that may be recovered and brought back on line within the storage domain.

Figure 1:
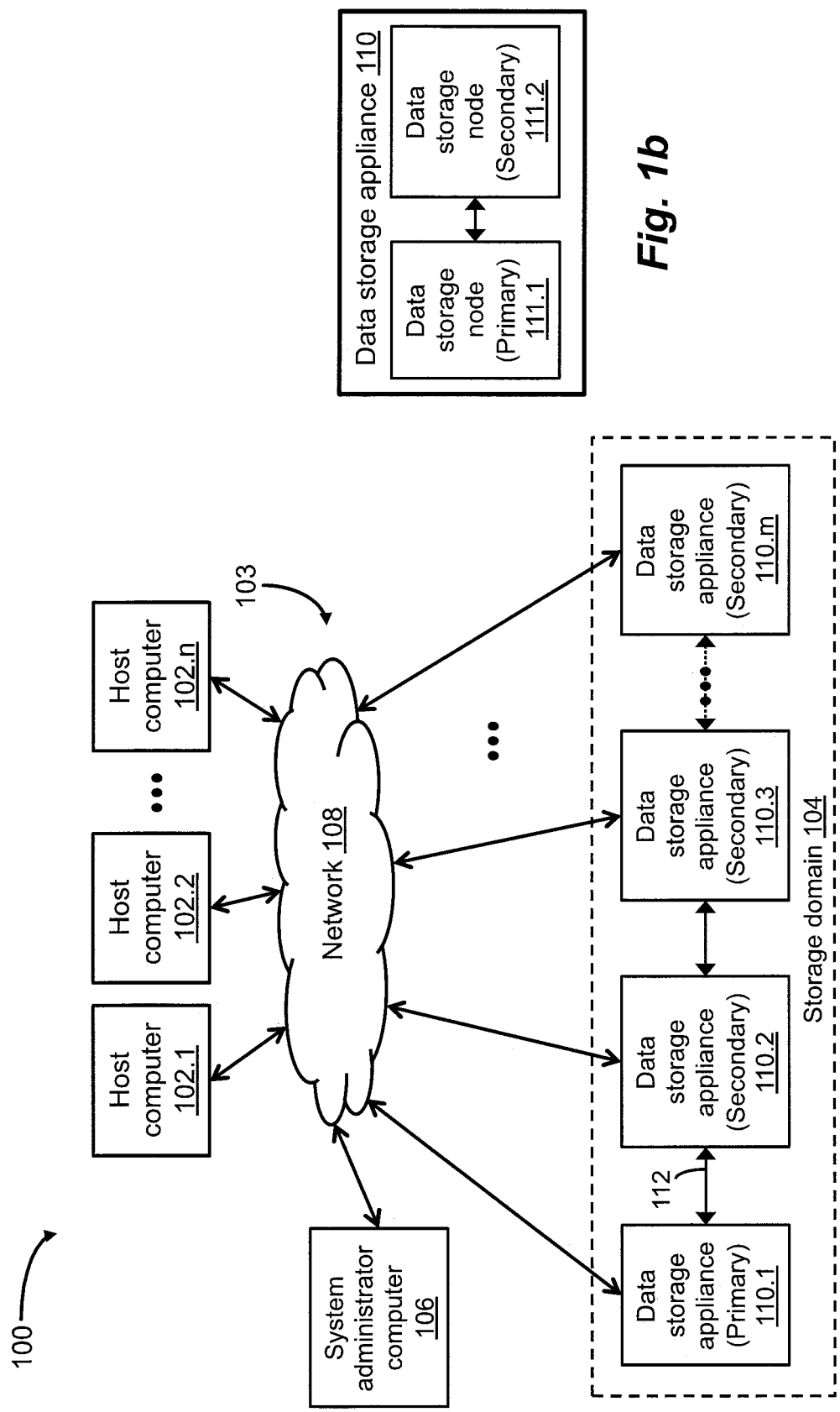

FIG. 1a depicts an illustrative embodiment of a clustered storage environment 100, in which exemplary techniques for synchronizing configuration information across multiple data storage appliances 110.1, 110.2, 110.3, . . . , 110.m within a storage domain 104 can be employed. As shown in FIG. 1a, the clustered storage environment 100 can include the multiple data storage appliances 110.1, . . . , 110.m, a plurality of host computers 102.1, 102.2, . . . , 102.n, and a system administrator computer 106, each of which is communicably coupled to a communications medium 103 that includes a network 108. For example, each of the plurality of host computers 102.1, . . . , 102.n may be configured as a web server computer, a file server computer, an email server computer, an enterprise server computer, and/or any other suitable computer or computerized device. Further, each of the data storage appliances 110.1, . . . , 110.m may be a member of the storage domain 104 defined and/or configured by the system administrator computer 106, which may be remote from (such as in a data center) or local to one or more of the data storage appliances 110.1, . . . , 110.m.

For example, the system administrator computer 106 may include at least one processor, a local memory, an input device (e.g., keyboard, mouse, touchpad, touchscreen), a display, and a network interface. Within the clustered storage environment 100 of FIG. 1*a*, the system administrator computer 106 can execute program instructions out of its local memory to enable a system administrator or other user to define and/or configure the storage domain 104 of the respective storage appliances 110.1, . . . , 110.*m*. The plurality of host computers 102.1, . . . , 102.*n* can provide input/output (IO) requests (e.g., small computer system interface (SCSI) commands) to one or more of the data storage appliances 110.1, . . . , 110.*m* over the network 108. For example, such IO requests may direct the respective storage appliances 110.1, . . . , 110.*m* to write and/or read data blocks to/from logical storage units (LUNs) and/or virtual volumes (VVOLs) on behalf of the respective host computers 102.1, . . . , 102.*n*. It is noted that, in the exemplary techniques for synchronizing configuration information described herein, one of the data storage appliances 110.1, . . . , 110.*m* (such as the data storage appliance 110.1) can be elected or otherwise designated to perform (at least temporarily) a role of a primary appliance within the storage domain 104, while the remaining data storage appliances 110.1, . . . , 110.*m* (such as the data storage appliances 110.2, 110.3, . . . , 110.*m*) can each perform (at least temporarily) a role of a secondary appliance within the storage domain 104.

The communications medium 103 including the network 108 can be configured to interconnect the host computers 102.1, . . . , 102.*n*, the data storage appliances 110.1, . . . , 110.*m*, and/or the system administrator computer 106 to enable the respective host computers, data storage appliances, and/or system administrator computer to communicate and exchange electronic and/or optical signals. As shown in FIG. 1*a*, at least a portion of the communications medium 103 is illustrated as a "cloud" to indicate that the communications medium 103 can have a variety of different topologies, including, but not limited to, a backbone topology, a hub-and-spoke topology, a loop topology, an irregular topology, or any suitable combination thereof. The communications medium 103 can also include, but is not limited to, copper-based data communications devices and cabling, fiber optic-based devices and cabling, wireless devices, or any suitable combination thereof. In addition, the communications medium 103 can be configured to support storage area network (SAN)-based communications, local area network (LAN)-based communications, cellular communications, wide area network (WAN)-based communications, distributed infrastructure communications, and so on, or any suitable combination thereof.

FIG. 1*b* depicts an illustrative embodiment of a data storage appliance 110 that can be included in the storage domain 104 of FIG. 1*a*. It is noted that each of the data storage appliances 110.1, . . . , 110.*m* of FIG. 1*a* can be configured like the data storage appliance 110 of FIG. 1*b*. As shown in FIG. 1*b*, the data storage appliance 110 can include two data storage nodes 111.1, 111.2 for high availability. For example, one of the data storage nodes 111.1, 111.2 (such as the data storage node 111.1) may perform a role of a primary node within the data storage appliance 110, while another one of the data storage nodes 111.1, 111.2 (such as the data storage node 111.2) may perform a role of a secondary node within the data storage appliance 110. Further, the primary node 111.1 may (i) receive IO requests from the plurality of host computers 102.1, . . . , 102.*n* over the network 108, (ii) in response to the IO requests, write and/or read data blocks to/from one or more LUNs and/or VVOLs, and, (iii) at least at intervals, synchronize the data on the LUNs and/or VVOLs with data stored in association with the secondary node 111.2. In the event of a failure of the primary node 111.1 of the data storage appliance 110, the secondary node 111.2 of the data storage appliance 110 may assume the duties of the primary node 111.1, providing high availability within the storage domain 104.

Figure 2:
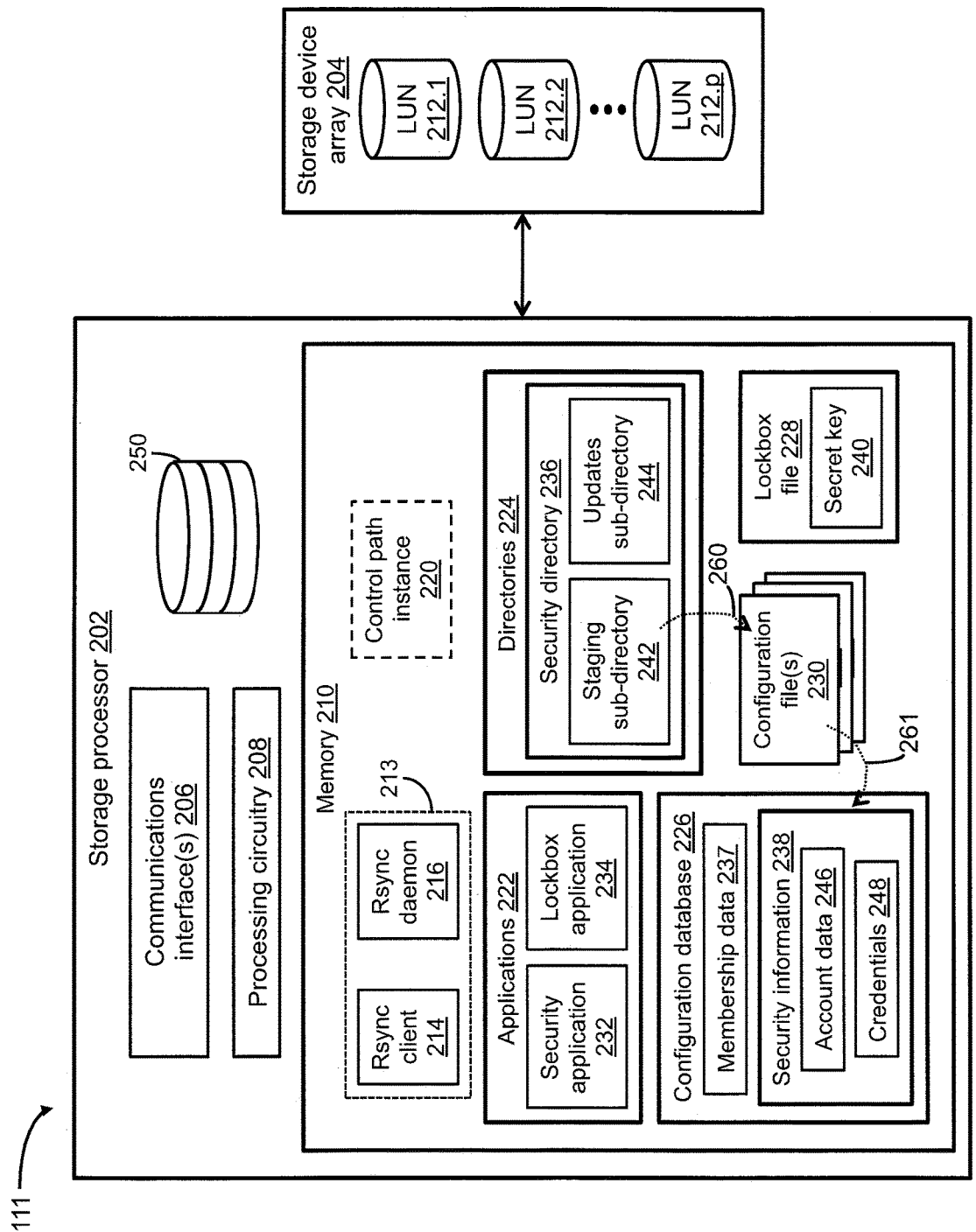
FIG. 2 is a block diagram of an exemplary data storage node included in the data storage appliance of FIG. 1b.

FIG. 2 depicts an illustrative embodiment of a data storage node 111 that can be included in the data storage appliance 110 of FIG. 1*b*. It is noted that each of the data storage nodes 111.1, 111.2 of FIG. 1*b* can be configured like the data storage node 111 of FIG. 2. As shown in FIG. 2, the data storage node 111 can include a storage processor 202 and a storage device array 204. The storage processor 202 can include one or more communications interfaces 206, specialized processing circuitry 208, and a local memory 210, as well as a local drive 250 (e.g., hard disk drive (HDD), solid state drive (SSD)) that stores an operating system (OS) image, boot information, etc. The communications interface(s) 206 can be configured to connect the data storage appliance 110 to the network 108, enabling access to/from the system administrator computer 106 and/or the respective host computers 102.1, . . . , 102.*n*, as appropriate. Such access over the network 108 can be SAN-based, Internet protocol (IP)-based, cellular-based, cable-based, fiber optic-based, cloud-based, wireless, and so on, or any suitable combination thereof.

The local memory 210 of the storage processor 202 (see FIG. 2) can be configured to include volatile storage (e.g., dynamic random access memory (DRAM), static random access memory (SRAM)), as well as non-volatile storage (e.g., magnetic memory, flash memory). As shown in FIG. 2, the local memory 210 can be configured to store a variety of software constructs, including a file transfer and synchronization engine 213, one or more software applications 222, one or more directories 224 such as a security directory 236, a configuration database 226 containing domain membership data 237 and security information 238, one or more configuration files 230, and a lockbox file 228. For example, the domain membership data 237 may include a member identifier and an IP address for each of the data storage appliances 110.1, . . . , 110.*m* within the storage domain 104. Further, the security information 238 may include user account data 246 and domain credentials 248, such as a username and password (or certificate). In one embodiment, the file transfer and synchronization engine (also referred to herein as the "rsync engine") 213 is implemented using the rsync program, which is an open source utility available under the GNU General Public License (GPL) for providing incremental file transfer and synchronization across computer systems. As such, the rsync engine 213 can be configured to include an rsync client 214 and an rsync daemon 216. It is noted, however, that the rsync engine 213 can be implemented using any other suitable program or utility for transferring and synchronizing files across computer systems. It is also noted that the local memory 210 of the storage processor 202 of the primary node 111.1 can further include a control path instance 220, as further described hereinbelow.

The software applications 222 included in the local memory 210 (see FIG. 2) can include at least a security application 232 and a lockbox application 234. The lockbox file 228, which includes a secret key 240, can be configured to store, on behalf of the security application 232, information that is accessible through the lockbox application 234. Although the lockbox file 228 is illustrated in FIG. 2 as being stored in the local memory 210, it is noted that the lockbox file 228 can be stored on the local drive 250 or any other suitable non-volatile storage media. The lockbox application 234 and the lockbox file 228 are further described in U.S. Pat. No. 9,910,791 entitled MANAGING SYSTEM-WIDE ENCRYPTION KEYS FOR DATA STORAGE SYSTEMS issued Mar. 6, 2018, the disclosure of which is hereby incorporated herein by reference in its entirety. The configuration file(s) 230 can be configured as database files for storing various configuration information pertaining to the data storage appliances 110.1, . . . , 110.m within the storage domain 104, including, but not limited to, groupings of redundant arrays of inexpensive disks (RAID), logically defined storage devices, and security information pertaining to user accounts and/or domain credentials.

The security application 232 included in the local memory 210 (see FIG. 2) is an exemplary client application that can be employed for automatically propagating configuration information (e.g., the security information 238) contained in the configuration file(s) 230 for storage among the data storage appliances 110.1, . . . , 110.m. Having been propagated to a respective data storage appliance 110.1, 110.2, . . . , or 110.m, the security information 238 (e.g., the user account data 246, the domain credentials 248) can be accessed from the configuration file(s) 230 in the security directory 236 (including a staging sub-directory 242 and an updates sub-directory 244), and securely stored in the configuration database 226, in accordance with the techniques described herein. Although the staging sub-directory 242 and the updates sub-directory 244 are illustrated in FIG. 2 as being stored in the local memory 210, it is noted that the staging and updates sub-directories 242, 244 can be stored on the local drive 250 or any other suitable non-volatile storage media. It is noted that the security application 232 can make use of the security information 238 stored in the configuration database 226 through the lockbox application 234.

The various software constructs stored in the local memory 210 of the storage processor 202 (see FIG. 2) can include one or more sets of instructions that direct the specialized processing circuitry 208 to implement the techniques described herein. For example, the processing circuitry 208 may be implemented in various ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof. In the context of the processing circuitry 208 being implemented using one or more processors running specialized software, a computer program product can be configured to deliver all or a portion(s) of the various software constructs to the processing circuitry 128. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by one or more of the processors, perform the techniques described herein. Such media may be considered to be articles of manufacture, and may be transportable from one data storage system to another data storage system.

The storage device array 204 of the data storage node 111 (see FIG. 2) can include a plurality of data storage devices 212.1, 212.2, . . . , 212.p (e.g., LUNs), such as hard disk drives (HDDs), solid state drives (SSDs), tape drives, optical drives, network attached storage (NAS) devices, SAN devices, and so on. The respective LUNs 212.1 . . . , 212.p can be locally attached to an IO channel of the data storage node 111, while also being accessible over the network 108. It is noted that each LUN 212.1, . . . , or 212.p can be a single stand-alone component, or a system of data storage devices such as a collection of drives (e.g., a RAID group) logically operating together as a unified storage device to provide a desired level of data protection through redundancy. In one embodiment, the storage device array 204 is implemented as a dual-ported drive that can be shared between the primary node 111.1 and the secondary node 111.2 of each data storage appliance 110.

The techniques described herein for synchronizing configuration information across the data storage appliances 110.1, . . . , 110.m within the storage domain 104 (see FIG. 1a) allow the system administrator or other user to make additions and/or updates to the configuration information contained in the configuration file(s) 230, and then automatically propagate the configuration file(s) 230 for storage within the respective storage appliances 110.1, . . . , 110.m. The techniques can perform such automatic propagation of the configuration file(s) 230 within the storage domain 104 by allowing the user to write or otherwise make changes to one or more configuration files 230, and, once the configuration file(s) 230 are determined to be stable, placing the configuration file(s) 230 in the staging sub-directory 242 of a primary appliance (e.g., the data storage appliance 110.1; see FIG. 1a) within the storage domain 104. Having placed the configuration file(s) 230 in the staging sub-directory 242 of the primary appliance 110.1, the techniques can initiate a background process (e.g., the rsync daemon 216) that copies the configuration file(s) 230 in the staging sub-directory 242 to the updates sub-directory 244 of the primary appliance 110.1, and automatically propagates the configuration file(s) 230 in the updates sub-directory 244 of the primary appliance 110.1 to corresponding updates sub-directories in multiple secondary appliances (e.g., the data storage appliances 110.2, . . . , 110.m) within the storage domain 104.

Once the configuration file(s) 230 have been propagated to the secondary appliances 110.2, . . . , 110.m within the storage domain 104, the techniques can initiate another background process (e.g., the rsync daemon 216) within the respective secondary appliances 110.2, . . . , 110.m that copies the configuration file(s) 230 in the updates directory 244 of each secondary appliance 110.2, 110.3, . . . , or 110.m to the staging sub-directory 242 of the secondary appliance 110.2, 110.3, . . . , or 110.m, and copies the configuration file(s) 230 in the staging sub-directory 242 of the secondary appliance 110.2, 110.3, . . . , or 110.m for storage in the configuration database 226 of the secondary appliance 110.2, 110.3, . . . , or 110.m. By allowing the user to make changes to the configuration file(s) 230 associated with the primary appliance 110.1 within the storage domain 104, and automatically propagating the configuration file(s) 230 in a background process from the primary appliance 110.1 to multiple the secondary appliances 110.2, . . . , 110.m within the storage domain 104, the user can more readily assure consistency of the configuration information, not only among the primary and secondary appliances 110.1, . . . , 110.m within the storage domain 104, but also among any unavailable or unreachable data storage appliance(s) that may be recovered and brought back on line within the storage domain 104.

The techniques described herein for synchronizing configuration information across the data storage appliances 110.1, . . . , 110.m within the storage domain 104 (see FIG. 1a) will be further understood with reference to the following illustrative example. In this example, the data storage appliance 110.1 performs the role of a primary appliance within the storage domain 104. Further, operations of the primary appliance 110.1 are described with reference to a single secondary appliance, namely, the data storage appliance 110.2. It is noted, however, that the operations performed by the primary appliance 110.1 apply also with reference to multiple secondary appliances (e.g., two or more of the data storage appliances 110.2, . . . , 110.m) within the storage domain 104.

In this example, the primary appliance 110.1 is deemed to be a member of the storage domain 104. Further, the primary appliance 110.1 wishes to be authenticated to the secondary appliance 110.2. To that end, the primary appliance 110.1 communicates over the network 108 with the system administrator computer 106 to determine whether or not the secondary appliance 110.2 is also a member of the storage domain 104. If the primary appliance 110.1 determines, based on communications with the system administrator computer 106, that the secondary appliance 110.2 is a member of the storage domain 104, then the primary appliance 110.1 obtains domain credentials (e.g., username, password or certificate) of the secondary appliance 110.2 from the system administrator computer 106, and stores the domain credentials of the secondary appliance 110.2 in the domain credentials 248 area of the security information 238 of the configuration database 226. The primary appliance 110.1 then authenticates itself to the secondary appliance 110.2 using the domain credentials of the secondary appliance 110.2, eventually establishing a secure channel 112 (see FIG. 1a) between the primary appliance 110.1 and the secondary appliance 110.2. In one embodiment, a secure socket shell (SSH) connection can be established over the secure channel 112 between the respective storage appliances 110.1, 110.2.

Once the secure channel 112 is established, the primary appliance 110.1 obtains membership data (e.g., member identifier, IP address) over the secure channel 112 from the secondary appliance 110.2, and stores the membership data in the membership data 237 area of the configuration database 226. The primary appliance 110.1 also accesses the secret key 240 from the lockbox file 228, and sends a copy of the secret key 240 over the secure channel 112 from the control path instance 220 running on the primary node 111.1 of the primary appliance 110.1 to the control path instance 220 running on primary node 111.1 of the secondary appliance 110.2. Having received the copy of the secret key 240 at the control path instance 220, the secondary appliance 110.2 stores the secret key 240 in the lockbox file 228 of each of the primary and secondary nodes 111.1, 111.2 of the secondary appliance 110.2. The secret keys 240 stored and persisted in the lockbox files 228 of the primary appliance 110.1 and the secondary appliance 110.2 can subsequently be used for encrypting and/or decrypting sensitive information contained in the configuration file(s) 230 that are transferred from and/or received at the respective storage appliances 110.1, 110.2.

Further, in this example, a system administrator or other user of the system administrator computer 106 wishes to add a new user account to the security information 238 contained in the configuration database 226 of the primary appliance 110.1. To that end, the user of the system administrator computer 106 interacts, over the network 108, with the security application 232 running on the primary appliance 110.1. For example, the security application 232 may be running in association with the rsync client 214 on the primary node 111.1 of the primary appliance 110.1. Further, the security application 232 may be configured to allow the user to add the new user account to the security information 238 by writing to or otherwise updating one of the configuration files 230, which may be configured as database files. Once the user has updated the configuration file 230 with the new user account information, the rsync client 214 calls a script that (i) accesses the updated configuration file 230, (ii) places the configuration file 230 in the staging sub-directory 242 on the primary node 111.1 of the primary appliance 110.1, and (iii) copies the new user account information contained in the configuration file 230 to the user account data 246 area of the security information 238 of the configuration database 226 on the primary node 111.1 of the primary appliance 110.1, as illustrated by directional arrows 260, 261 (see FIG. 2). The rsync client 214 also notifies the rsync daemon 216 on the primary node 111.1 of the primary appliance 110.1, informing the rsync daemon 216 that the configuration file 230 in the staging sub-directory 242 is ready for transfer.

Having been informed that the configuration file 230 is ready for transfer, the rsync daemon 216 initiates a background process that (i) copies the configuration file 230 in the staging sub-directory 242 on the primary node 111.1 of the primary appliance 110.1 to the updates sub-directory 244 on the primary node 111.1 of the primary appliance 110.1, (ii) transfers the configuration file 230 in the updates sub-directory 244 on the primary node 111.1 of the primary appliance 110.1 to the updates sub-directory 244 on the secondary node 111.2 of the primary appliance 110.1, and (iii) copies the new user account information contained in the configuration file 230 to the user account data 246 area of the security information 238 of the configuration database 226 on the secondary node 111.1 of the primary appliance 110.1, as illustrated by the directional arrows 260, 261. Further, the background process automatically propagates the configuration file 230 in the updates sub-directory 244 on the primary node 111.1 of the primary appliance 110.1 to the secondary appliance 110.2. For example, the background process may identify and locate the secondary appliance 110.2 within the storage domain 104 using the membership information (e.g., member identifier, IP address) of the secondary appliance 110.2, which is included in the domain membership data 237 area of the configuration database 226. Further, the background process may call a crypto-application programming interface (API), which accesses the secret key 240 from the lockbox file 228, and encrypts the configuration file 230 using the secret key 240. It is noted that the encrypted configuration file 230 can be propagated from the primary appliance 110.1 to the secondary appliance 110.2 over the secure channel 112 within the storage domain 104. In one embodiment, the configuration file 230 can be propagated over the secure channel 112 as encrypted IP traffic within an IP security (IPsec) tunnel.

Once the configuration file 230 has been propagated to the secondary appliance 110.2, the rsync daemon 216 on the primary node 111.1 of the secondary appliance 110.2 initiates another background process that (i) receives the encrypted configuration file 230 in the updates sub-directory 244 on the primary node 111.1 of the secondary appliance 110.2, (ii) decrypts the configuration file 230 using the secret key 240 in the lockbox file 228, (iii) copies the decrypted configuration file 230 from the updates directory 244 to the staging sub-directory 242 of the primary node 111.1 of the secondary appliance 110.2, and (iv) copies the new user account information contained in the configuration file 230 to the user account data 246 area of the security information 238 of the configuration database 226 on the primary node 111.1 of the secondary appliance 110.2, as illustrated by the directional arrows 260, 261. Likewise, the rsync daemon 216 on the secondary node 111.2 of the secondary appliance 110.2 initiates still another background process that (i) receives the encrypted configuration file 230 in the updates sub-directory 244 on the secondary node 111.1 of the secondary appliance 110.2, (ii) decrypts the configuration file 230 using the secret key 240 in the lockbox file 228, (iii) copies the decrypted configuration file 230 from the updates directory 244 to the staging sub-directory 242 of the secondary node 111.1 of the secondary appliance 110.2, and (iv) copies the new user account information contained in the configuration file 230 to the user account data 246 area of the security information 238 of the configuration database 226 on the secondary node 111.1 of the secondary appliance 110.2, as illustrated by the directional arrows 260, 261. In this way, the configuration files 230 stored on the primary and secondary nodes 111.1, 111.2 of the primary appliance 110.1, as well as the primary and secondary nodes 111.1, 111.2 of the secondary appliance 110.2, can be synchronized within the storage domain 104.

In one embodiment, while transferring the configuration file 230 from the updates sub-directory 244 on one data storage node 111 to the updates sub-directory 244 on another data storage node 111, the background process initiated by the rsync daemon 216 can compare a timestamp on the configuration file 230 being transferred with another timestamp on a corresponding configuration file in the updates sub-directory 244 of the other data storage node 111, thereby determining whether or not the configuration file 230 being transferred is a new or newly updated file. In the event the configuration file 230 is determined to be a new or newly updated file based on the comparison of the respective file timestamps, the background process can proceed with the transfer of the configuration file 230 to synchronize the contents of the updates directories 244 on the respective storage nodes. Otherwise, if the configuration file 230 is determined not to be a new or newly updated file, then the background process may terminate the transfer of the configuration file 230. In a further embodiment, the background process initiated by the rsync daemon 216 may also compare checksums or hash values associated with corresponding configuration files in the updates directories of the respective storage nodes, and determine whether to proceed with or terminate the file transfer based further on the comparison of the respective file checksums or hash values.

Figure 3:
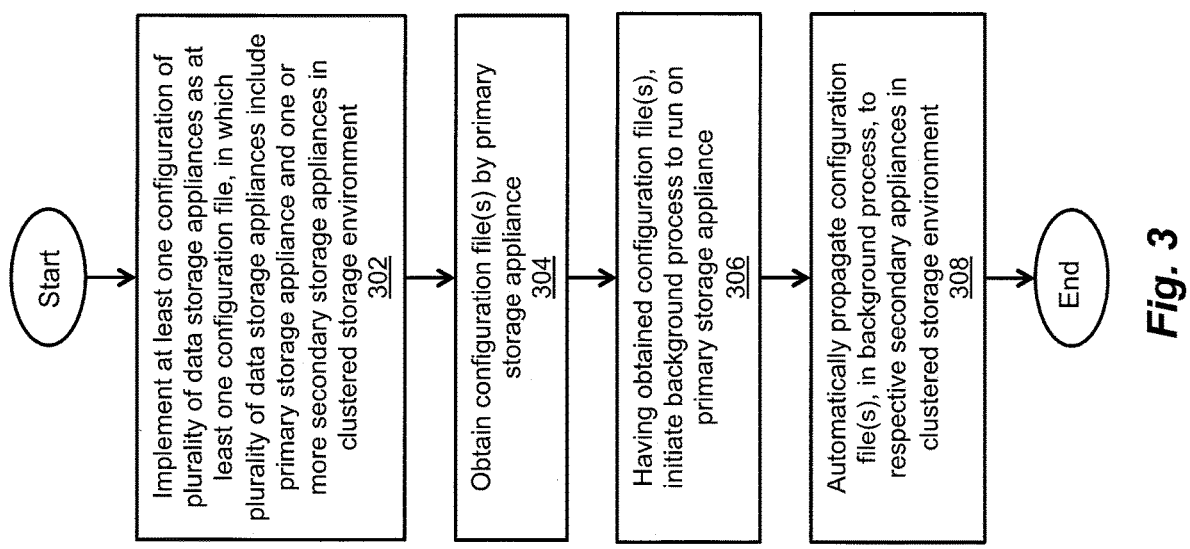

An exemplary method of synchronizing configuration information across a plurality of data storage appliances in a clustered storage environment is described below with reference to FIG. 3. As depicted in block 302, at least one configuration of the plurality of data storage appliances is implemented as at least one configuration file, in which the plurality of data storage appliances include a primary storage appliance and one or more secondary storage appliances in the clustered storage environment. As depicted in block 304, the configuration file(s) are obtained by the primary storage appliance. As depicted in block 306, having obtained the configuration file(s), a background process is initiated to run on the primary storage appliance. As depicted in block 308, the configuration file(s) are automatically propagated, in the background process, to the respective secondary appliances in the clustered storage environment.

Having described the above illustrative embodiments, other modifications and/or variations may be made and/or practiced. For example, it was described herein that the security information 238 (e.g., user account data, domain credentials) can be accessed from the configuration file(s) 230 in the staging sub-directory 242 and/or the updates sub-directory 244 of the security directory 236, and that the staging sub-directory 242 and the updates sub-directory 244 can be stored on the local drive 250 of the storage processor 202 (see FIG. 2). In one embodiment, the configuration file(s) 230 can be synchronized in the clustered storage environment 100 by having the primary appliance (e.g., the data storage appliance 110.1) in the storage domain 104 cycle through all of the secondary appliances (e.g., the data storage appliances 110.2, ..., 110.$m$) in the storage domain 104 using the rsync engine 213, reading changes made to the configuration file(s) 230 on any of the secondary appliances, and automatically propagating the changes made to the configuration file(s) 230 from the primary appliance to all of the secondary appliances. In a further embodiment, a data storage node (such as the data storage node 111 containing the processing circuitry 208, the local memory 210, and the local drive 250; see FIG. 2) may be removed from the data storage appliance 110 and replaced with a new data storage node 111. The local drive 250 of the new data storage node 111, however, may not contain the domain credentials 248 and/or other boot information required to boot-up the new data storage node 111 on the data storage appliance 110. In such an embodiment, the domain credentials 248 and/or other boot information may be stored on a RAID slice of the storage device array 204 associated with the new data storage node 111. It is noted that the domain credentials 248 and/or other boot information may be stored on the storage device array 204 in two separate storage volumes, e.g., one storage volume for each of the data storage nodes 111.1, 111.2 in the data storage appliance 110.

As further described herein, the secret key 240 stored and persisted in the lockbox file 228 can be employed for encrypting and/or decrypting sensitive information contained in the configuration file(s) 230 transferred from and/or received at the respective storage appliances 110.1, ..., 110.$m$ in the storage domain 104. In one embodiment, the secret key 240 can be employed to encrypt and/or decrypt such sensitive information using a quorum of storage system parameters, such as one or more hardware serial numbers, one or more secrets stored on various local drives 250, etc. Such a quorum of data storage parameters may be maintained even if a configuration update of the data storage appliances 110.1, ..., 110.$m$ changes one or more of the storage system parameters. Using such a quorum of storage system parameters for encrypting and/or decrypting sensitive information may also prevent an attacker from successfully accessing the encrypted sensitive information stored in the configuration database 226. For example, the quorum of storage system parameters used in conjunction with the secret key 240 may be stored in association with the lockbox file 228 of each data storage node 111 of the data storage appliance 110.

As still further described herein, while transferring the configuration file 230 from one data storage appliance 110 to another data storage appliance 110, the background process initiated by the rsync daemon 216 can compare a timestamp on the configuration file 230 being transferred with another timestamp on the corresponding configuration file 230 stored on the other data storage appliance 111, thereby determining whether or not the configuration file 230 being transferred is a new or newly updated file. In one embodiment, to assure that the configuration file 230 being transferred has the most recent version of the configuration information, one data storage appliance 110 among the data storage appliances 110.1, . . . , 110.*m* may be elected or otherwise designated to perform a role of a primary appliance within the storage domain 104, and another data storage appliance 110 among the data storage appliances 110.1, . . . , 110.*m* may be elected or otherwise designated to perform a role of a standby primary appliance within the storage domain 104. Further, updates to the configuration file(s) 230 within the storage domain 104 may be prioritized such that the primary appliance and the standby primary appliance always have access to the configuration file(s) 230 containing the most recent version of the configuration information. Moreover, rather than allowing any of the data storage appliances 110.1, . . . , 110.*m* to perform the role of primary appliance within the storage domain 104, only the primary appliance or the standby primary appliance may be elected or otherwise designated to perform such a role. For example, the first data storage appliance that joins the storage domain 104 as a member may be designated to perform the role of the primary appliance, and the next data storage appliance that joins the storage domain 104 as a second member may be designated to perform the role of the standby primary appliance. Further, all other data storage appliances that join the storage domain 104 as members after the primary appliance and the standby primary appliance may be designated to perform the roles of secondary appliances. In the event of a failure of the designated primary appliance, the standby primary appliance may then assume the duties of the primary appliance, providing high availability of the clustered data storage appliances.

While various embodiments of the invention have been particularly shown and described, it will be understood by those skilled in the art that various changes in form and details may be made therein without departing from the scope of the invention as defined by the appended claims.

What is claimed is:

1. A method of synchronizing configuration information across a plurality of data storage appliances in a clustered storage environment, comprising:
    implementing at least one configuration of the plurality of data storage appliances as at least one configuration file, the plurality of data storage appliances including a primary storage appliance and one or more secondary storage appliances in the clustered storage environment;
    obtaining the at least one configuration file by the primary storage appliance;
    having obtained the at least one configuration file, initiating a background process to run on the primary storage appliance;
    automatically propagating the at least one configuration file, in the background process, from the primary storage appliance to the respective secondary storage appliances in the clustered storage environment,
    wherein the implementing of the at least one configuration of the plurality of data storage appliances includes updating the at least one configuration of the plurality of data storage appliances, and implementing the at least one updated configuration of the plurality of data storage appliances as at least one updated configuration file; and
    placing the at least one updated configuration file in a staging directory of the primary storage appliance,
    wherein the initiating of the background process to run on the primary storage appliance includes informing a daemon application of the primary storage appliance that the at least one updated configuration file has been placed in the staging directory of the primary storage appliance.

2. The method of claim 1 wherein the primary storage appliance is a member of a storage domain, and wherein the method further comprises:
    determining whether the respective secondary storage appliance among the one or more secondary storage appliances is a second member of the storage domain.

3. The method of claim 2 further comprising:
    having determined that the respective secondary storage appliance is the second member of the storage domain, obtaining domain credentials of the respective secondary storage appliance; and
    authenticating the primary storage appliance to the respective secondary storage appliance using the domain credentials.

4. The method of claim 3 further comprising:
    having authenticated the primary storage appliance to the respective secondary storage appliance, establishing a secure channel between the primary storage appliance and the respective secondary storage appliance.

5. The method of claim 4 wherein the automatic propagating of the at least one configuration file to the respective secondary storage appliances includes automatically propagating the at least one configuration file, in the background process, to the respective secondary storage appliance over the secure channel within an Internet protocol (IP) security (IPsec) tunnel.

6. The method of claim 4 wherein the primary storage appliance stores a secret key in association with a lockbox file, and wherein the method further comprises:
    sending, over the secure channel, a copy of the secret key from the primary storage appliance to the respective secondary storage appliance for storage in association with a second lockbox file on the respective secondary storage appliance.

7. The method of claim 6 further comprising:
    encrypting the at least one configuration file in the background process,
    wherein the automatic propagating of the at least one configuration file to the respective secondary storage appliances in the clustered storage environment includes automatically propagating, over the secure channel, the at least one encrypted configuration file, in the background process, to the respective secondary storage appliances in the clustered storage environment.

8. The method of claim 1 further comprising:
    having informed the daemon application, performing the background process by the daemon application of the primary storage appliance.

9. The method of claim 1 wherein the automatic propagating of the at least one configuration file to the respective secondary storage appliances in the clustered storage environment includes copying, in the background process, the at least one updated configuration file in the staging directory of the primary storage appliance to an updates directory of the primary storage appliance.

10. The method of claim 9 wherein the automatic propagating of the at least one configuration file to the respective secondary storage appliances in the clustered storage environment further includes automatically propagating, in the background process, the at least one updated configuration file in the updates directory of the primary storage appliance to corresponding updates directories in the respective secondary storage appliances in the clustered storage environment.

11. The method of claim 9 wherein the respective secondary storage appliance among the one or more secondary storage appliances has an updates directory, and wherein the automatic propagating of the at least one configuration file to the respective secondary storage appliances in the clustered storage environment further includes comparing a timestamp on the at least one updated configuration file in the updates directory of the primary storage appliance with another timestamp on a corresponding configuration file in the updates directory of the respective secondary storage appliance to determine whether the at least one updated configuration file is a new or newly updated configuration file.

12. The method of claim 11 wherein the automatic propagating of the at least one configuration file to the respective secondary storage appliances in the clustered storage environment further includes, having determined that the at least one updated configuration file is the new or newly updated configuration file, automatically propagating, in the background process, the new or newly updated configuration file in the updates directory of the primary storage appliance to the updates directory of the respective secondary storage appliances.

13. A system for synchronizing configuration information across a plurality of data storage appliances in a clustered storage environment, comprising:
a primary storage appliance; and
one or more secondary storage appliances,
wherein the primary storage appliance is configured:
to obtain at least one updated configuration file that implements at least one configuration of the plurality of data storage appliances in the clustered storage environment;
having obtained the at least one updated configuration file, to initiate a background process to run on the primary storage appliance; and
to automatically propagate the at least one updated configuration file, in the background process, to the respective secondary storage appliances in the clustered storage environment,
wherein the primary storage appliance is further configured to place the at least one updated configuration file in a staging directory of the primary storage appliance, and to inform a daemon application of the primary storage appliance that the at least one updated configuration file has been placed in the staging directory of the primary storage appliance.

14. The system of claim 13 wherein the primary storage appliance is further configured, having informed the daemon application, to perform the background process by the daemon application of the primary storage appliance.

15. A computer program product having a non-transitory computer readable medium that stores a set of instructions to synchronize configuration information across a plurality of data storage appliances in a clustered storage environment, the set of instructions, when carried out by computerized circuitry, causing the computerized circuitry to perform a method of:
implementing at least one configuration of the plurality of data storage appliances as at least one updated configuration file, the plurality of data storage appliances including a primary storage appliance and one or more secondary storage appliances in the clustered storage environment;
obtaining the at least one updated configuration file by the primary storage appliance;
having obtained the at least one updated configuration file, initiating a background process to run on the primary storage appliance;
automatically propagating the at least one updated configuration file, in the background process, from the primary storage appliance to the respective secondary storage appliances in the clustered storage environment;
placing the at least one updated configuration file in a staging directory of the primary storage appliance; and
informing a daemon application of the primary storage appliance that the at least one updated configuration file has been placed in the staging directory of the primary storage appliance.

16. The computer program product of claim 15 wherein the method further comprises, having informed the daemon application of the primary storage appliance, performing the background process by the daemon application of the primary storage appliance.

* * * * *